United States Patent

Boutaghou et al.

Patent Number: 5,896,646
Date of Patent: Apr. 27, 1999

[54] BASE PLATE WITH IMPROVED TORQUE RETENTION

[75] Inventors: Zine-Eddine Boutaghou, Vadnais Heights; Richard August Budde, Plymouth, both of Minn.

[73] Assignee: Seagate Technology, Inc., Scotts Valley, Calif.

[21] Appl. No.: 08/966,312

[22] Filed: Nov. 7, 1997

Related U.S. Application Data

[60] Provisional application No. 60/046,318, May 13, 1997.

[51] Int. Cl.$^6$ .................................................. G11B 5/127
[52] U.S. Cl. ..................... 29/603.01; 29/603.04; 29/603.05; 29/603.06
[58] Field of Search ........................ 29/603.01, 603.04, 29/603.05, 603.06; 360/104; 72/391.4, 391.2

[56] References Cited

U.S. PATENT DOCUMENTS

| | | | |
|---|---|---|---|
| 3,744,008 | 7/1973 | Castellani | 339/103 B |
| 4,796,122 | 1/1989 | Levy et al. | 360/98.01 |
| 5,097,584 | 3/1992 | Cain et al. | 29/407 |
| 5,124,855 | 6/1992 | Dew et al. | 360/97.02 |
| 5,262,911 | 11/1993 | Cain et al. | 360/104 |
| 5,444,587 | 8/1995 | Johnson et al. | 360/104 |
| 5,471,733 | 12/1995 | Bernett et al. | 29/603 |
| 5,657,531 | 8/1997 | Sato et al. | 29/603.04 |
| 5,677,815 | 10/1997 | Chan | 360/106 |
| 5,717,545 | 2/1998 | Brooks, Jr. et al. | 360/104 |

OTHER PUBLICATIONS

Hagenlocher, W. A., IBM Technical Disclosure Bulletin, *Ball Staking of a Transducer Assembly Mounting Block to a Positioned Arm*, vol. 18, No. 1, Jun. 1975, p. 226.

*Primary Examiner*—Joseph J. Hail, III
*Assistant Examiner*—William Hong
*Attorney, Agent, or Firm*—Kinney & Lange

[57] ABSTRACT

A base plate is used to attach the head/gimbal assembly of a disc drive to an actuator arm. The base plate has a boss which fits into an opening in the actuator arm. In one embodiment, one of the inner surface of the opening in the actuator arm and the outer surface of the boss is constructed of polymer, and the other is constructed of metal. The base plate is secured to the actuator arm by swaging the raised portion of the base plate to the opening in the actuator arm. During swaging, the layer of polymer material yields to conform to the metal surface, thereby providing a swage connection with superior holding friction and retention torque. In another embodiment, the boss includes a plurality of raised portions defining a cylinder having a relaxed outer diameter greater than the inner diameter of the opening in the actuator arm. The outer surfaces of the plurality of portions engage the inner surface of the actuator arm to elastically deform and conform to and bias against the inner surface of the actuator arm, thereby providing a connection with superior holding friction, and retention torque.

18 Claims, 2 Drawing Sheets

BASE PLATE WITH IMPROVED TORQUE RETENTION

CROSS REFERENCE TO RELATED APPLICATION

This application claims priority from U.S. provisional application No. 60/046318 filed May 13, 1997 for "A Base Plate With Improved Torque Retention" by Zine-Eddine Boutaghou and Richard Budde.

BACKGROUND OF THE INVENTION

The present invention relates to improvements in disc drive assemblies, and more particularly, the invention relates to an improved base plate for mounting the head/gimbal assembly of a magnetic disc drive to an actuator arm.

In disc drives, the head/gimbal assembly is attached to the actuator arm by swaging a base plate to the actuator arm. The base plate holds the head/gimbal assembly in place and restricts relative movement during subsequent assembly, transportation, shipping and operation of the disc drive. Typically, both the base plate and the actuator arm are constructed of metal materials. For example, a stainless steel base plate may be swaged to an extruded aluminum actuator arm.

In order to swage the base plate into the actuator arm, a tubular boss of the base plate is fit into an opening in the actuator arm. A ball is then driven through the tubular boss. Because the boss has an inner diameter smaller than the outer diameter of the ball, the ball exerts a deforming load on the boss. The boss plastically deforms to press against the opening walls in the actuator arm as the ball passes through the boss. To hold the head/gimbal assembly in place, the interface between the base plate and the actuator arm must develop a suitable minimum retention torque, preferably at least about ten inch-ounces. The amount of retention torque in a swage connection is dictated by the frictional force between the swaged members, which in turn is based on the friction between the boss material and the actuator arm material, the residual stresses in the boss of the swage, and the elastic stress in the actuator arm.

The frictional force developed between two surfaces depends on the coefficient of friction between the two surfaces, and the force perpendicular to the plane of relative motion between the two surfaces, or normal force. Thus, the friction between the outer surface of the boss and the inner surface of the opening in the actuator arm is dependant on the force exerted perpendicular to the interface (the normal force) between the boss and the actuator arm and the coefficient of friction between the two surfaces.

In the past the materials used to construct the actuator arm and the base plate were metal, such as aluminum and steel. In a swage connection, both the boss and the arm deformed during swaging, smoothing both metal surfaces, and creating a somewhat smooth interface between the metals. Neither the boss nor the arm returned to its original dimensions after the deforming load was released. As a result, no force is necessary to maintain the boss' and arm's newly deformed dimensions, once they have been deformed by the ball. The resulting smooth interface of the swage connection diminished the coefficient of friction between the boss and the actuator arm, a typical coefficient of friction between a stainless steel base plate and aluminum actuator arm that are swaged together is in the range of 0.1 to 0.3.

BRIEF SUMMARY OF THE INVENTION

In one embodiment of the invention, a base plate is provided for securing a head/gimbal assembly to an actuator arm of a disc drive. The base plate includes a raised portion, or boss, arranged to engage an opening in the actuator arm. One of the inner surface of the opening in the actuator arm and the outer surface of the boss of the base plate is constructed of a polymer material having a relatively low yield stress. The other surface is constructed of a metal having a relatively high yield stress. The base plate is swaged into the opening in the actuator arm so that the polymer surface engages the metal surface and the polymer yields to conform to the metal. In one form of this embodiment, the raised portion of the base plate is a hollow tube.

Another aspect of the present invention is a method for securing the head/gimbal assembly of a disc drive to an actuator arm with a base plate. In a first embodiment of the method, a layer of polymer is formed on one of the outer surface of the boss of the base plate and the inner surface of the opening in the actuator arm. The other of the two surfaces is metal. The head/gimbal assembly is sandwiched between the base plate and the actuator arm so that the raised portion of the base plate extends through an aperture of the head assembly. The raised portion of the base plate is then swaged to the opening in the actuator arm so that the layer of polymer engages the other surface and yields to conform with the other surface.

The present invention overcomes the limitations inherent in swaging the base plate to the actuator arm. In the invention, the relatively lower yield strength of polymer allows the polymer material to flow into and around the irregular metal surface during swaging, preserving the irregular metal surface at the interface after swaging. The irregular polymer/metal interface results in a high coefficient of friction between the two materials, and therefore a high retention torque between the base plate and the actuator arm. Additionally, the higher coefficient of friction permits the use of smaller swage balls and less pre-load force during swaging.

DETAILED DESCRIPTION OF THE PREFERRED EMBODIMENTS

Figure 1:
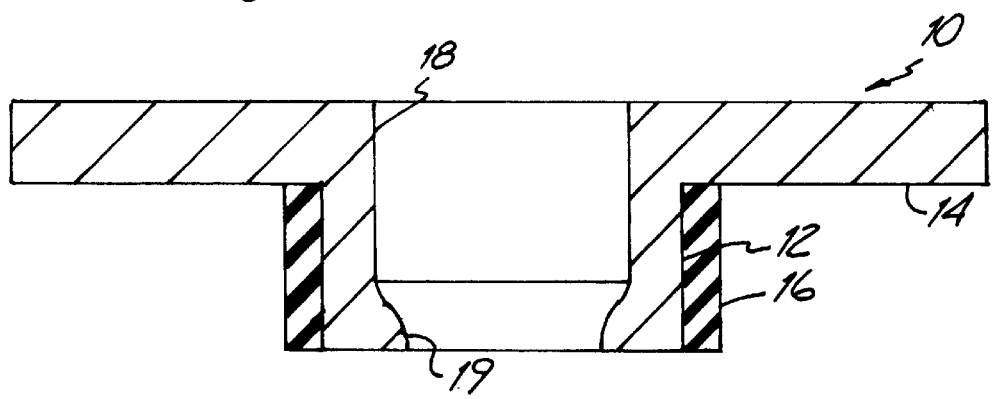
FIG. 1 is a section view of a base plate according to a first embodiment of the present invention.

FIG. 1 illustrates a base plate for a swage connection according to the first embodiment of the present invention. Base plate 10 includes cylindrical boss 12 and flange portion 14. Polymer layer 16 is on the outer cylindrical surface of the boss. Circular passage 18 through the boss has a constriction 19 having inner diameter d1. The polymer layer forms outer boss diameter d2. Polymer layer 16 has a yield stress in the range of 4 to 9 Kpsi.

Figure 2:
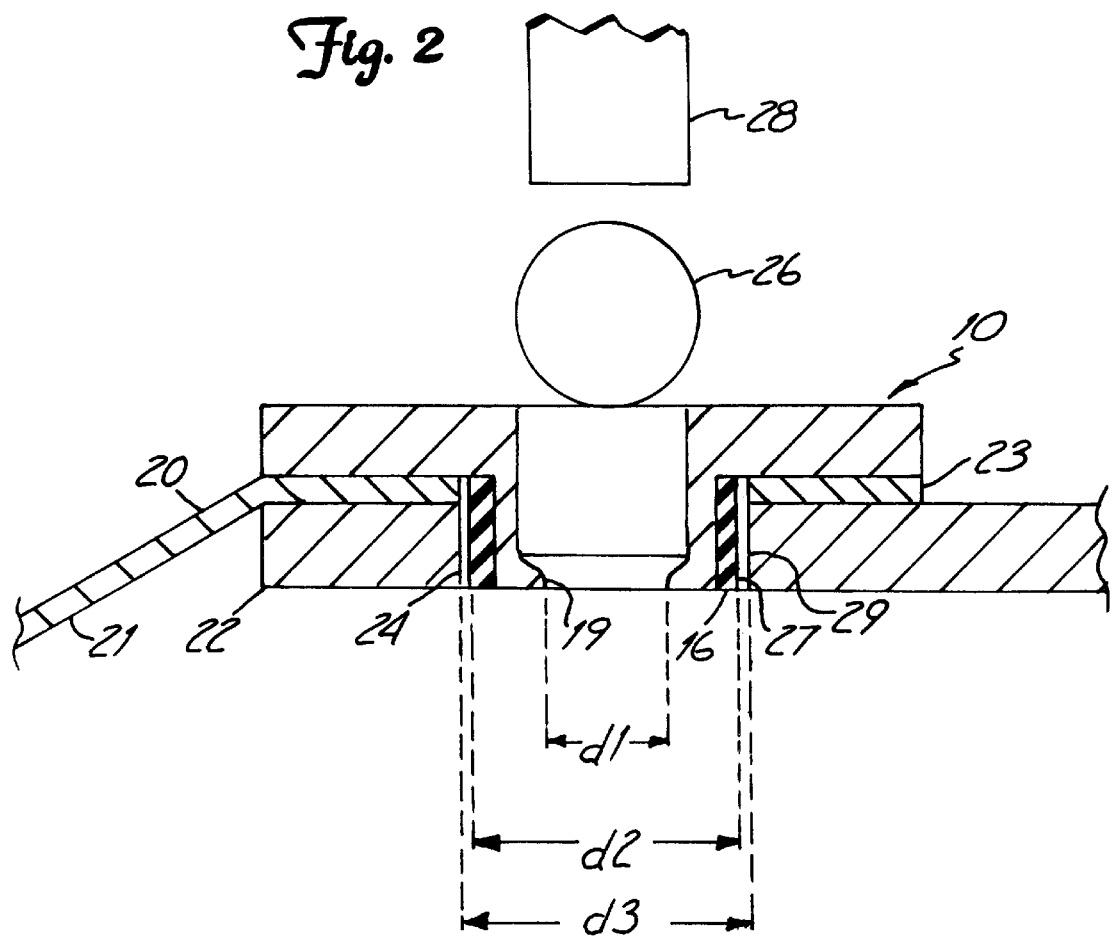
FIG. 2 shows an assembly of the base plate with an actuator arm and a head/gimbal assembly according to the first embodiment.

As shown in FIG. 2, base plate 10 attaches head/ gimbal assembly 20 to actuator arm 22 by swaging. A depending portion 21 extends from the portion 23 sandwiched between the base plate and the actuator arm, the depending portion extending to the head (not shown) of the disc drive. Opening 24 in the actuator arm has diameter d3 to accept the cylindrical boss. The outer boss diameter d2 is no greater than the diameter d3 of the opening in the actuator arm. With the elements assembled, ball 26 is driven through the passage in the cylindrical boss, such as by ram 28. Ball has a diameter greater than inner diameter d1 of constriction 19, so that as the ball passes through the passage and the constriction, the ball deforms the boss so that the boss engages the opening in the actuator arm. As the boss engages the opening in the actuator arm, outer surface 27 of the polymer layer deforms to conform to inner surface 29 of the opening in the actuator arm.

Figure 3A:
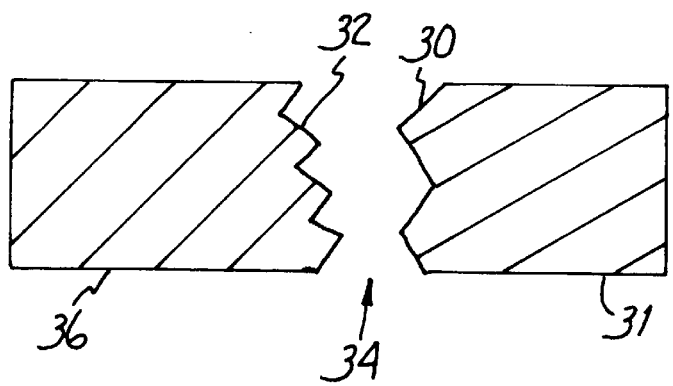
FIGS. 3A and 3B are illustrations depicting the engaging surfaces of an actuator arm and a boss before and after swaging according to the prior art.
Figure 3B:
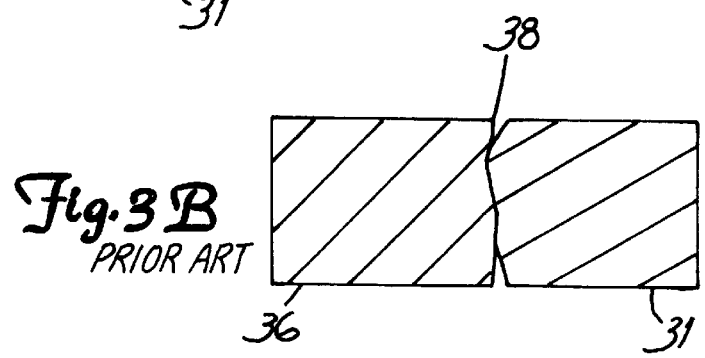

FIGS. 3 and 4 compare the swage interface achieved with an embodiment of the present invention and the prior art. In the past it was common to swage a stainless steel boss to an aluminum actuator arm. Aluminum has a yield stress in the range of 50 to 70 Kpsi and the stainless steel used in base plates usually has a yield stress in the range of 20 to 30 Kpsi. FIG. 3A shows a microscopically rough outer surface 30 of stainless steel boss 31 and a microscopically rough inner surface 32 of opening 34 in aluminum actuator arm 36. Surfaces 30 and 32 are irregular. FIG. 3B shows interface 38 between the stainless steel boss and the aluminum actuator arm is relatively smooth compared to the initial irregular surfaces shown in FIG. 3A. Because the yield stress of the aluminum inner surface is in the range of only about one to three times greater than the yield stress of the stainless steel outer surface, deformation is not substantially limited to one surface. Instead, both surfaces deform during swaging to smooth out microscopic irregularities in both surfaces, as the surfaces conform to each other. The smooth interface limits the coefficient of friction between and therefore limits the retention torque between the base plate and the actuator arm.

Figure 4A:
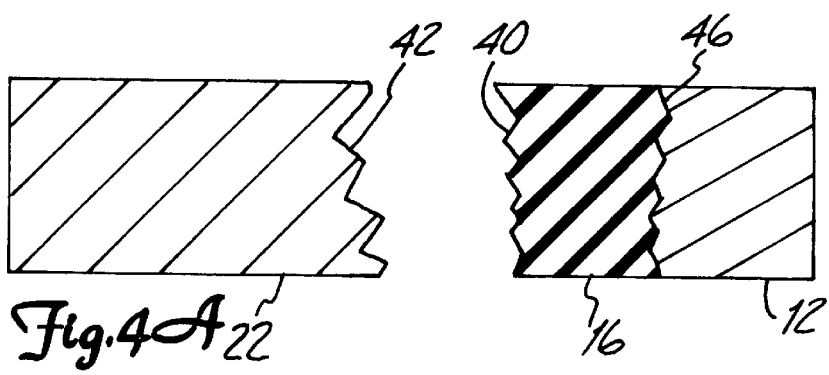
FIG. 4A and 4B are illustrations depicting the engaging surfaces of an actuator arm and a boss before and after swaging according to the first embodiment.
Figure 4B:
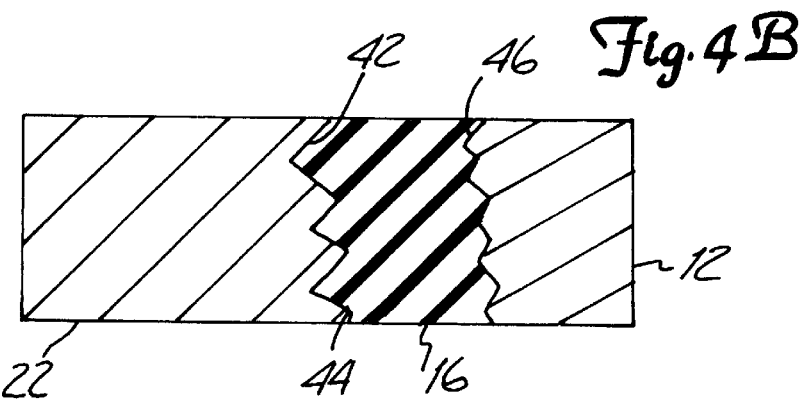

FIG. 4A shows that in an embodiment of the present invention both outer surface 40 of polymer layer 16 on cylindrical boss 12 and inner surface 42 of metal actuator arm 22 are microscopically rough and irregular. In contrast to the prior swage connection shown in FIG. 3B, when the base plate and actuator arm of the present invention are swaged together as shown in FIG. 4B, irregular interface 44 is the result of the polymer layer yielding to the irregular surface 42 of the aluminum actuator arm. The polymer layer preferably has a yield stress in the range of five to ten times less than the yield stress of the inner surface of the opening in the metal actuator arm. Because the yield stress of the polymer layer is significantly less than the yield stress of the aluminum actuator arm, the polymer outer surface deforms to conform to the irregularities in the aluminum inner surface, resulting in an irregular and interlocked interface after swaging. The polymer material flows into and around the irregular metal surface during swaging, thereby preserving the irregular metal surface at interface 44 after swaging. The irregular interface results in a coefficient of friction of about 0.5 and 0.8 between the polymer outer surface and the aluminum inner surface. As a comparison, the coefficient of friction of the stainless steel/aluminum swage connection of the prior art was only about 0.1 to 0.3, The higher coefficient of friction achieved by the present invention results in a retention torque greater than 10 inch-ounces between the base plate and the actuator arm.

As shown in FIGS. 4A and 4B, polymer layer 16 also conforms to the irregular surface 46 of stainless steel plate 12.

Although the present invention has been described with reference to preferred embodiments, workers skilled in the art will recognize that changes may be made in form and detail without departing from the spirit and scope of the invention.

What is claimed:

1. A swage-fit base plate for attaching a head assembly of a disc drive to an actuator arm having an opening having an inner surface surrounding an arm, comprising:

a flange for sandwiching a portion of the head assembly between the flange and the actuator arm;

a boss, the boss being deformable to swage fit to the opening in the actuator arm to rigidly attach to the inner surface of the opening; and the boss having means to engage the inner surface when the boss is swage fit to the opening to retain the boss within the opening.

2. The base plate as in claim 1, wherein the means for attaching comprises an expandable metal boss extending from the flange, the boss having an outer surface, and a layer of polymer material over one of the outer surface of the boss and the inner surface of the opening in the actuator arm.

3. The base plate as in claim 2, wherein the layer of polymer material is over the outer surface of the boss, and the actuator arm is constructed of metal.

4. The base plate as in claim 2, wherein the boss is a cylinder.

5. The base plate as in claim 2, wherein the layer of polymer material is over the inner surface of the opening in the actuator arm.

6. A base plate as in claim 5, wherein the actuator arm is constructed of polymer.

7. A base plate as in claim 2, wherein the layer of polymer material has a yield stress in the range of 4 to 9 Kpsi and the metal has a yield stress in the range of 20 to 70 Kpsi.

8. A base plate as in claim 2, wherein the metal has a yield in the range of 5 to 10 times greater than the yield stress of the polymer material.

9. A swage-fit base plate for attaching a head assembly of a disc drive to an actuator arm having an opening, the opening having an inner surface, the base plate having a flange portion for sandwiching a portion of the head assembly between the flange portion and the actuator arm, the base plate further having a raised expandable boss portion having an outer surface, the improvement comprising:

a layer of polymer material over one of the outer surface of the raised portion and the inner surface of the opening in the actuator arm, the other of the inner surface of the opening and the outer surface of the raised portion being constructed of metal, the layer of polymer material on the one surface being so disposed and arranged as to yield to conform to and rigidly engage the other metal surface when the boss portion is positioned within the opening in the actuator arm and expanded.

10. A base plate as in claim 9, wherein the layer of polymer material is over the outer surface of the raised portion of the base plate and the actuator arm is metal.

11. A base plate as in claim 9, wherein the raised portion is a cylinder.

12. A base plate as in claim 9, wherein the layer of polymer material is over the inner surface of the opening in the actuator arm, and the raised boss portion is metal.

13. A base plate as in claim 12, wherein the actuator arm is constructed of polymer.

14. A base plate as in claim 9, wherein the layer of polymer material has a yield stress in the range of 4 to 9 Kpsi and the metal has a yield stress in the range of 20 to 70 Kpsi.

15. A base plate as in claim 9, wherein the metal has a yield in the range of 5 to 10 times greater than the yield stress of the polymer material.

16. A method for securing a head assembly of a disc drive to an actuator arm with a base plate, the actuator arm having an opening, the opening having an inner surface, the base plate having a flange portion and a raised deformable boss portion having an outer surface, comprising the steps:

forming a layer of polymer on one of the outer surface of the raised portion and the inner surface of the opening in the actuator arm;

sandwiching a portion of the head assembly between a base plate and the actuator arm so that the raised boss portion of the base plate extends through an opening in the head assembly and into the opening in the actuator arm; and swaging the raised boss portion to the opening in the actuator arm so that the raised boss portion deforms causing the layer of polymer on the one surface to yield to conform to the other surface and thereby rigidly engage the other surface.

17. A method as in claim 16, wherein the layer of polymer material has a yield stress in the range of 4 to 9 Kpsi and the metal has a yield stress in the range of 20 to 70 Kpsi.

18. The method as in claim 16, wherein the metal has a yield stress in the range of 5 to 10 times greater than the yield stress of the polymer material.

* * * * *